United States Patent
Shiraga

(10) Patent No.: US 7,403,979 B2
(45) Date of Patent: Jul. 22, 2008

(54) FILE RECORDING SYSTEM

(75) Inventor: Shinji Shiraga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 10/689,718

(22) Filed: Oct. 22, 2003

(65) Prior Publication Data

US 2004/0083276 A1    Apr. 29, 2004

(30) Foreign Application Priority Data

Oct. 23, 2002  (JP) ............................. 2002-308468

(51) Int. Cl.
    *G06F 15/16* (2006.01)
(52) U.S. Cl. ....................... 709/219; 709/202; 709/227; 709/228
(58) Field of Classification Search ................. 709/219
    See application file for complete search history.

(56) References Cited

U.S. PATENT DOCUMENTS

| | | | | |
|---|---|---|---|---|
| 5,806,005 | A * | 9/1998 | Hull et al. | 455/566 |
| 6,715,003 | B1 * | 3/2004 | Safai | 710/33 |
| 7,185,286 | B2 * | 2/2007 | Zondervan et al. | 715/762 |
| 2002/0069237 | A1 * | 6/2002 | Ehara | 709/200 |
| 2003/0065773 | A1 * | 4/2003 | Aiba et al. | 709/224 |
| 2007/0061857 | A1 * | 3/2007 | Seki et al. | 725/105 |

FOREIGN PATENT DOCUMENTS

| | | |
|---|---|---|
| JP | 9-307794 | 11/1997 |
| JP | 2000-353121 | 12/2000 |
| JP | 2002-073461 | 3/2002 |
| JP | 2002-169864 | 6/2002 |

* cited by examiner

*Primary Examiner*—Jason Cardone
*Assistant Examiner*—Nicholas Taylor
(74) *Attorney, Agent, or Firm*—Fitzpatrick, Cella, Harper & Scinto

(57) ABSTRACT

A file transfer system is provided in which the image data photographed at a destination place by the user is easily transferred to a specific file server. Specifically, a memory card reader is controlled by a system controller. A memory card is a recording medium for saving an image data file. A modem has a function of implementing the external communications with the memory card reader employing a telephone line. In a specific recording area of the recording medium, the positional information indicating the position of any specific region on file servers is recorded, and when the recording medium is mounted on the memory card reader, the memory card reader reads the positional information and the file, and the file is transferred to the specific region on the file servers indicated by the positional information.

12 Claims, 7 Drawing Sheets

FIG. 3

AFTER TRANSFERRING ALL THE FILES TO

Tel: 0123-456-7890
http://www.xxxxx.yyy/server/hoge/

DELETE OR NOT THE FILE IN THE CARD? (Y/N)

FIG. 5

```
Img0001.jpg
Img0002.jpg
Img0003.jpg
ARE TRANSFERRED TO

Tel : 0123-456-7890
http://www.xxxxx.yyy/server/hoge/

OK OR NOT? (Y/N)
```

FIG. 6

Img0001.jpg
Img0002.jpg
Img0003.jpg

ARE DELETED FROM THE MEMORY CARD.
OK OR NOT? (Y/N)

FILE RECORDING SYSTEM

FIELD OF THE INVENTION

The present invention relates to a file recording system, and more particularly to a file recording system for transferring an image file recorded on a memory card to a file server.

BACKGROUND OF THE INVENTION

In recent years, the digital cameras have been widespread with great strides to excel the film cameras. In the digital cameras, the image data photographed is temporarily stored in a memory card mounted in this camera, and the recorded image data is transferred to a mass storage device at any time, making the memory card reusable. In this respect, the digital cameras are superior to the film cameras which employ a non-reusable film. However, the film has an advantage that it is purchased relatively easily and cheaply at a destination place. On the other hand, the memory card has the shortcomings that it is not always purchased anywhere easily, and is expensive.

Accordingly, the user of a digital camera needed to take some excess memory cards when photographing many images during the trip. Also, when excess memory cards were used up, more images could not be photographed.

Therefore, a camera has been proposed in which an image file is transferred to a file server by connecting a cellular telephone to the file server, as disclosed in Japanese Patent Laid-Open No. 9-307794. Also, most Internet Providers provide a service for allowing the user to utilize a disk space with a certain amount of capacity on the file server. In the future, it is expected that there are increasing business forms of lending out a part of the disk space on the file server.

However, when the image file was transferred via a network such as the Internet to the file server, the user needed to enter a telephone number and an IP address in order to designate a file server provider and a storage area (directory) of the file server available to the user, and then transfer the transfer files sequentially, which took a very complex operation and was inconvenient.

On the other hand, a disk space lending dealer was difficult to obtain many users because the dealer request a user complicated operations as described above, resulting in a problem of interfering with the business.

SUMMARY OF THE INVENTION

The present invention has been achieved in the light of the above-mentioned problems, and it is an object of the invention to provide a file recording system in which the image data photographed at a destination place by the user can be easily transferred to a specific file server.

According to the invention, there is provided a file recording system comprising reading means for reading out a file and the positional information of a file transfer destination from a removable recording medium storing the file and the positional information, and file transfer means for transferring the file read by the reading means to a specific region on a server specified by the read positional information.

According to the invention, there is provided an information storage medium for storing a file, comprising a file storage area for storing the acquired file, and a server address information storage area for storing the address information of a specific region on a predetermined server, the address information being used to transfer the file stored in the storage area to the server and store the file in the specific region on the server, wherein the file is transferred to the specific region of the server specified by the address information, when read by a reader.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing a display example of a transfer menu at default;

FIG. 5 is a view showing a display example of a confirmation screen for starting the file transfer;

FIG. 6 is a view showing a display example of a confirmation screen for starting the file deletion.

DETAILED DESCRIPTION OF THE PREFERRED EMBODIMENTS

Figure 1:
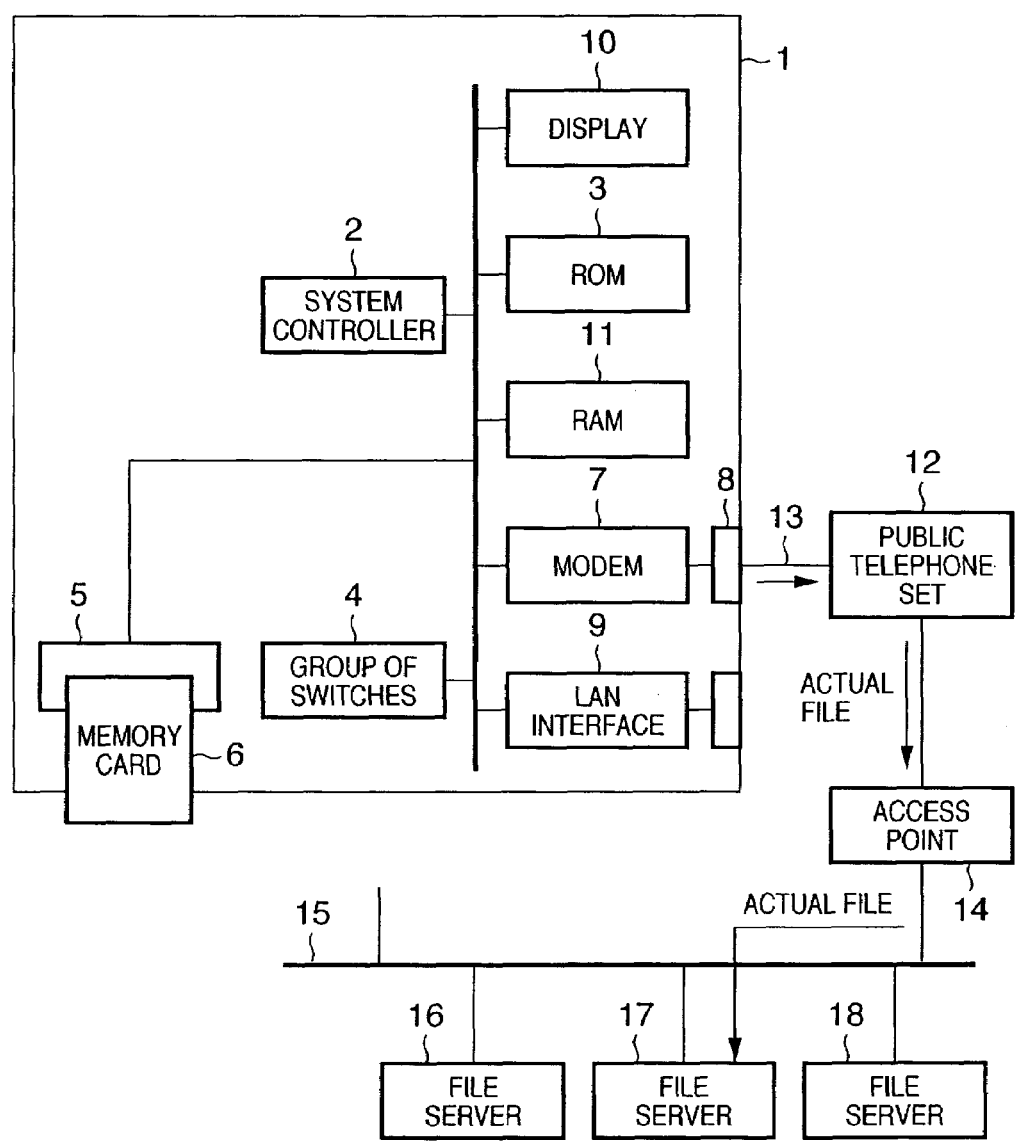
FIG. 1 is a block diagram showing a file recording system according to one embodiment of the present invention.

FIG. 1 is a block diagram showing a file recording system according to one embodiment of the present invention. In FIG. 1, reference numeral 1 denotes a memory card reader. The memory card reader 1 is controlled by a system controller 2 (such as CPU). The system controller 2 executes a control program written in a ROM 3 to control the memory card reader 1. A group of switches 4 includes an operation switch for use to issue a transfer start instruction.

A memory card slot 5 serves to insert a memory card 6 with the memory card reader 1. The memory card 6 is a recording medium for saving an image data file. A modem 7 has a function of implementing the external communications with the memory card reader 1 employing a telephone line. A connector 8 is used to connect the modem 7 with the external telephone line. A LAN (Local Area Network) interface 9 is the interface for connecting the memory card reader 1 with a network trunk line.

This interface may be also employed when connecting to the network equipment installed at KIOSK such as a convenience store. A display 10 displays a photographed image or a menu screen to the user. A RAM 11 temporarily stores the data.

The memory card reader 1 is installed within a housing of a public telephone 12, and a connection between the memory card reader 1 and the public telephone 12 is made through a modular cable 13. A CF (Compact Flash) card, for example, which is one of the memory cards 6, is inserted into or extracted from the memory card slot 5, whereby the user inserts or extracts the CF card into or from the front side of a public telephone set.

Figure 2:
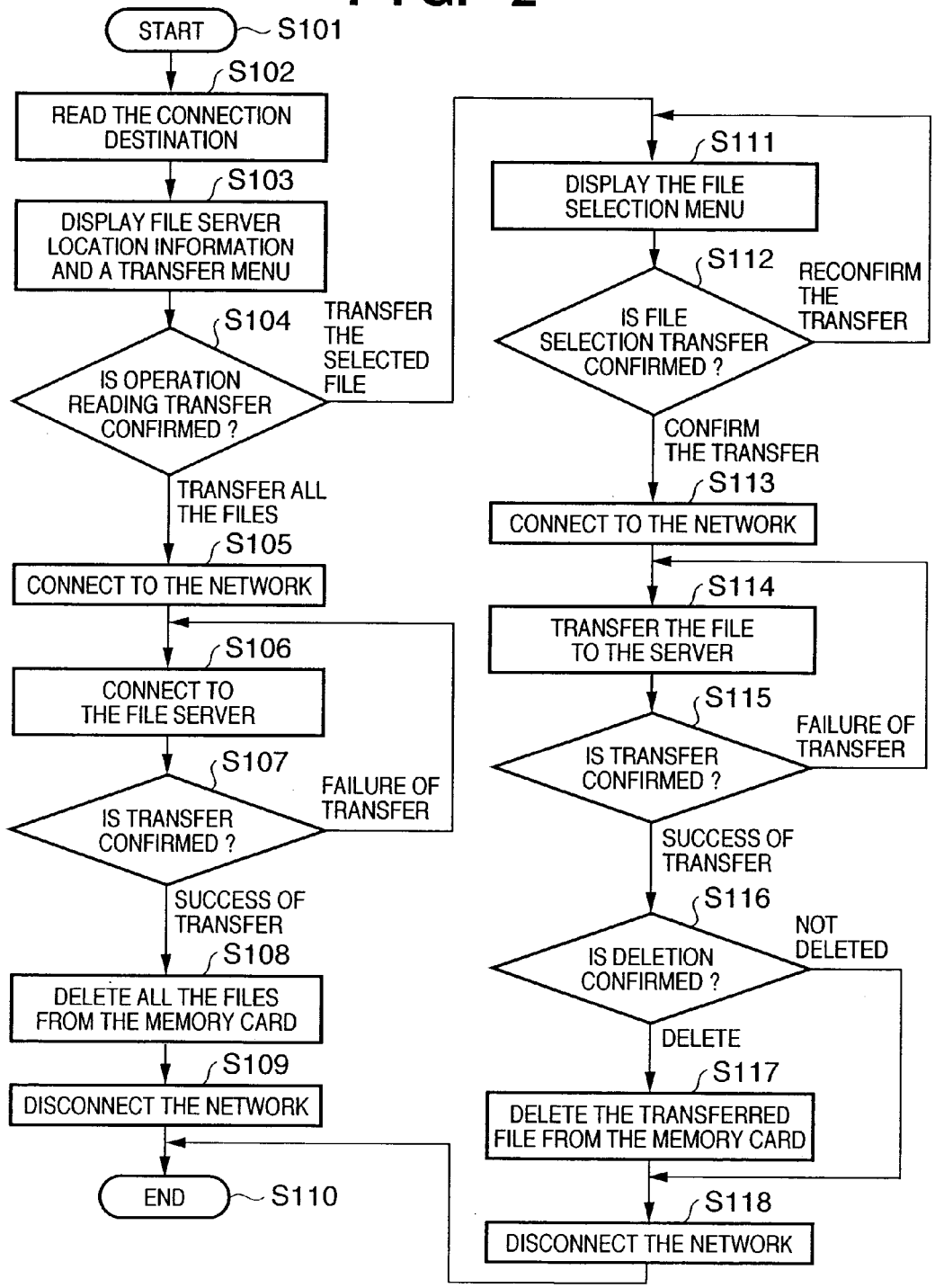
FIG. 2 is a flowchart for explaining an operation of transferring an image file to the file server in a memory card reader.

FIG. 2 is a flowchart showing the operation of transferring an image file to a file server in the memory card reader.

First of all, if the user inserts a CF card into the memory card slot 5, the system controller 2 is interrupted upon an interrupt signal, not shown, and reads an interrupt handler from the ROM 3 and executes it. The interrupt handler detects an insertion of the CF card, and initiates a file transfer application stored in the ROM 3.

At step S101 of FIG. 2, the file transfer application starts a process. After starting the process, the file transfer application reads a location of the file server 16, 17, 18 that is a file transfer destination from a predetermined area of the CF card at step S102. This area is preferably out of the control of the normal file system, and may be an attribute memory area (Card Information Structure or CIS), for example.

In this manner, the location of the file server 16, 17, 18 may be written at the time of shipment from the factory (before the memory card is manufactured and shipped to the seller) or at the time of sales to the customer in the shop front (before the seller sells the card to the customer) and inhibited from rewriting after the customer gets it.

The location of the file server 16, 17, 18 is represented by the combination of a telephone number and a URL (address information to which the file is stored), for example. This URL is different for each CF card, and after the file stored in the card is transferred to the server, the user gains access to the server employing the URL and views the transferred file. Also, to gain access to the URL, the user may be prompted to enter a password and a PIN code at the time of access for the security.

At step S103, the file transfer application displays the location information of the file server 16, 17, 18 read at step S102 on the display 10, and a default transfer menu as shown in FIG. 3. This default transfer menu asks the user whether or not to delete all the files within the CF card after transferring all the files within the CF card.

The user answers Yes or No, employing the group of switches 4. At step S104, the file transfer application reads an input of the user, and if the input is Yes, the file transfer is immediately started at step S105. Firstly, the modem 7 is controlled to make a call at the telephone number read at step S102 (access point 14 of the disk space lender), and connect to a network 15 of the disk space lending dealer in accordance with the TCP/IP (Transmission Control Protocol/Internet Protocol) and the PPP (Point-to-Point Protocol).

The file servers 16, 17 and 18 reside on the network 15. Among these file servers 16, 17 and 18, the file is transferred to the directory (file server 17 in this example) corresponding to the URL read at step S102 (step S106).

At step S107, the file transfer application confirms that the file server 16, 17, 18 has surely received the file. Furthermore, at step S108, all the files within the CF card are deleted. If a success of the file transfer is not confirmed at step S107, the procedure returns to step S106 again to restart the file transfer. If the success of the file transfer is confirmed, the network 15 is disconnected at step S109, and the execution of the program is ended (step S110).

Figure 4:
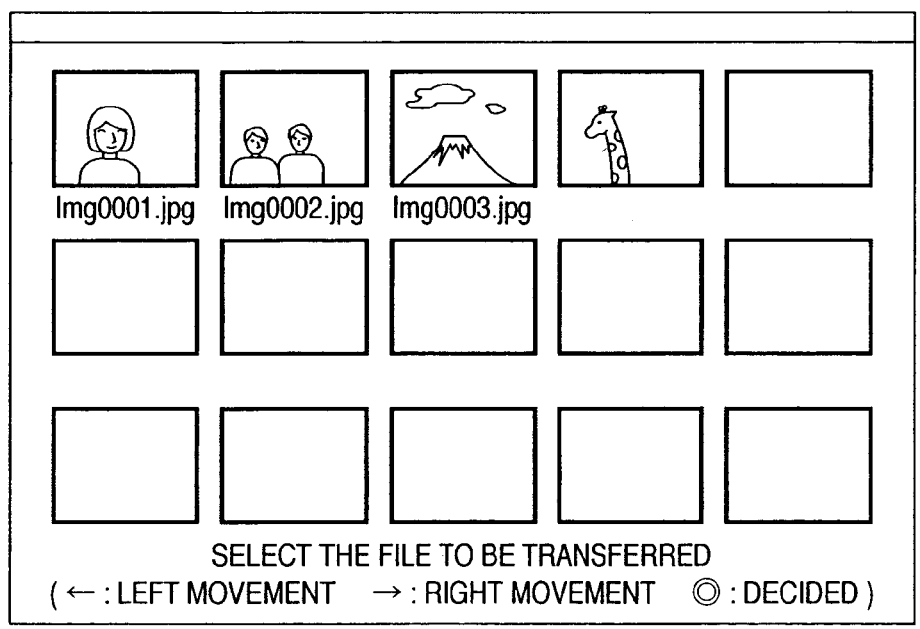
FIG. 4 is a view showing a display example of a file selection menu.

If the user input read at step S104 is No, a file selection menu is displayed on the display 10 at step S111 as shown in FIG. 4. The user designates a file to be transferred from the displayed thumbnail images by operating the group of switches 4. Herein, it is supposed that four actual files Img0001.jpg, Img0002.jpg, Img0003.jpg and Img0004.jpg exist, including the image generated by photographing within the CF card.

Also, it is supposed that the user selects three files Img0001.jpg, Img0002.jpg and Img0003.jpg as the transferred files. The selected thumbnail image flashes on and off in blue.

After selection of the file, the file transfer application displays a confirmation screen of starting the file transfer on the display 10 at step S112, as shown in FIG. 5, whereby the user instructs the start of transferring the file by operating the group of switches 4. The file transfer application reads an indication input from the user. If the input is Yes, connection to the network 15 is made at step S113, and the transfer of the selected file is started at step S114. If the input is No, the procedure returns to step S111.

At step S115, the file transfer application confirms that the file server 16, 17, 18 has surely received the file. Subsequently at step S116, the file transfer application asks the user whether or not to delete the transferred file from the CF card on a confirmation screen, as shown in FIG. 6. When a delete instruction is received, the transferred file is deleted at step S117, the network 15 is disconnected at step S118 and the application is ended (step S110). If the transferred file is not deleted, immediately the network is disconnected and the application is ended (step S110).

At step S115, if the success of file transfer is not confirmed, the procedure returns to step S114 again to restart the file transfer.

Other Embodiments

While in the above embodiment, a dial-up connection to the network 15 is made by employing the modem 7 of the memory card reader 1, the connection to the network 15 of the disk space lending dealer may be made via the LAN interface 9 over the Internet.

Also, while in the above embodiment, the CF card is employed as the memory card, other memory cards may be employed.

Also, while in the above embodiment, a file transfer application is stored in the ROM 3, it may be stored in other storage devices (e.g., hard disk), or downloaded via the network from other devices. Also, the file transfer application may be stored in the memory card 6.

Use Example of the File Recording System in the Embodiment

Figure 7:
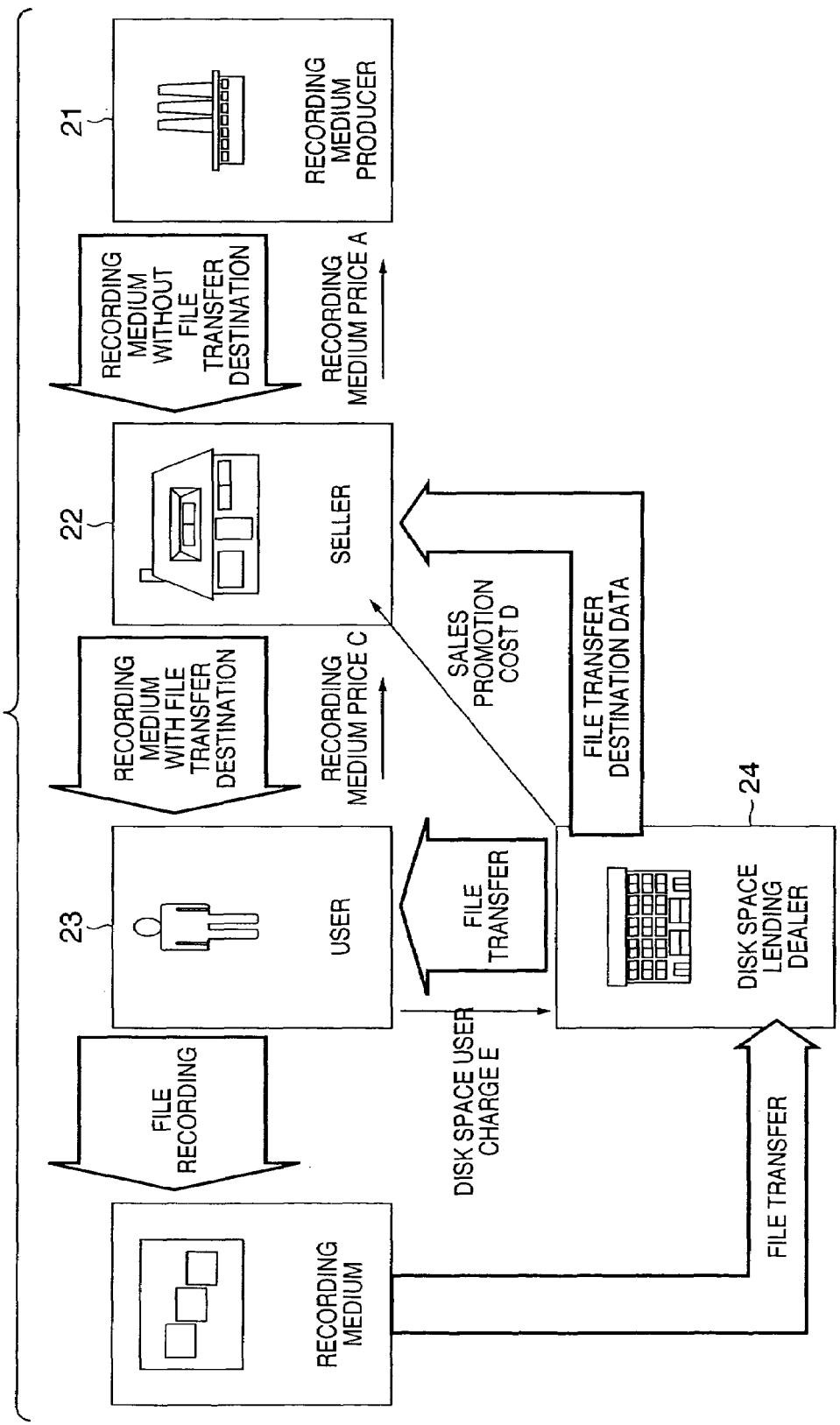
FIG. 7 is a diagram showing a first use example of this file recording system.

FIG. 7 is a view showing a first use example of this file recording system.

First of all, a recording medium producer 21 delivers a recording medium at the price A to a recording medium seller 22. The recording medium seller 22 registers file transfer destination data in the recording medium at the time of shipment from the factory, and sells the recording medium at the price A plus a profit B.

Then, the user 23 purchases the recording medium at the price C from the recording medium seller 22. Herein, there is a relation A+B>C, whereby the recording medium seller 22 bears a price charge A+B−C at this time. The recording medium seller 22 receives a sales promotion cost D from the disk space lending dealer 24 providing the registered file transfer destination data to compensate for the price charge.

Moreover, the user 23 pays a charge E for using the disk space for the disk space lending dealer 24, every time a file transfer service is employed. Accordingly, the allotment of the disk space lending dealer is equal to E−D.

By taking this use form, the user 23 can purchase the recording medium at the price C that is cheaper than the normal price A+B of the recording medium. The recording medium seller 22 can increase the amount of sales while securing the profit per medium equivalent to that when selling the normal recording medium. The disk space lending dealer 24 has the increasing number of users along with the increasing amount of sales.

In a second use example of the file recording system, the disk space lending dealer 24 pays a sales promotion cost D for the recording medium producer 21. The recording medium producer 21 registers the file transfer destination data for the recording medium, and delivers the recording medium at the price A–D to the recording medium seller 22. The recording medium seller 22 sells the recording medium at the price A–D plus a profit B. The user 23 purchases the recording medium at the price that is cheaper than A+B, whereby there is the same effect as in the first use example.

In the first and second use examples of the file recording system, the file transfer destination data is inhibited from rewriting by the user 23, and the sales promotion cost D of the disk space lending dealer 24 is prevented from being incorrectly appropriated.

In a third use example of the file recording system, the disk space lending dealer 24 directly delivers the file transfer destination data to the user 23, and the user 23 registers it in the recording medium by oneself. In this case, though an advantageous price is not obtained, the user is allowed to select a preferred one from a plurality of disk space lending dealers 24. If the user is dissatisfied, the user may change the dealer to lead to the higher availability.

As described above, with this invention, since the information indicating a file server provider and a region on the file server is stored in advance in the recording medium, there is the effect that the user can transfer the file very simply at a destination place.

Also, the disk space lender (the file server provider) can improve the usage of transferring the file to easily gain the users and develop the business. Furthermore, since the price of the recording medium is shifted to the sales promotion cost by the file server provider, the user can purchase the recording medium cheaply, and the recording medium producer and the recording medium seller can sell a greater number of recording media.

As many apparently widely different embodiments of the present invention can be made without departing from the spirit and scope thereof, it is to be understood that the invention is not limited to the specific embodiments thereof except as defined in the appended claims.

What is claimed is:

1. A file recording system comprising:
   reading means for reading out from a removable recording medium one or more files and location information of an apparatus that is a file transfer destination for the one or more files, the location information being recorded in an attribute memory area of the removable recording medium storing said one or more files and said location information;
   first display means for displaying, on a display, the location information read by said reading means, together with a first file transfer menu;
   first deletion designating means for acquiring an indication, via the displayed first file transfer menu before transmission of the one or more files, from a user of whether or not to delete all of the one or more files to be transferred from the removable recording medium after the files have been transferred,
   second display means for displaying, on the display if the indication acquired by the first deletion designating means is not to delete all of the one or more files to be transferred, a file selection menu for selecting files to be transferred;
   selecting means for selecting one or more files stored in the removable recording medium to be transferred to the apparatus corresponding to the location information read by said reading means;
   file transfer means for transferring all of the one or more files read by said reading means to a specific region on said apparatus corresponding to the location information read by said reading means if the first deletion designating means acquires the indication that all of the one or more files are to be deleted, or transferring the one or more files selected by the selecting means to said apparatus corresponding to the location information read by said reading means if the first deletion designating means acquires the indication that all of the one or more files are not to be deleted;
   confirmation means for confirming reception by the apparatus corresponding to the location information of the one or more files transferred by the file transfer means;
   second deletion designating means for, after the transmission of the selected one or more files and confirmation by the confirmation means, acquiring an indication from the user of whether or not to delete the one or more transferred files from the removable recording medium; and
   deletion means for deleting all of the one or more transferred files from the removable recording medium if the first deletion designating means acquires the indication to delete all of the one or more files, and for deleting the one or more files selected by the selecting means if the first deletion designating means acquires the indication not to delete all of the files and the second deletion designating means acquires the indication to delete the one or more selected files.

2. The file recording system according to claim 1, wherein said location information recorded on said removable recording medium is inhibited from rewriting.

3. The file recording system according to claim 1, wherein said file recording system further comprises a plurality of servers storing the files, and wherein said location information indicates a specific region on any one of said plurality of servers.

4. The file recording system according to claim 1, wherein said location information recorded on said removable recording medium is different for each removable recording medium.

5. The file recording system according to claim 1, wherein said location information is recorded on said removable recording medium before the shipment or sale of said removable recording medium to a customer.

6. A file transfer method for transferring one or more files recorded on a removable recording medium via a network to a predetermined server, said method comprising:
   a step of reading out from said removable recording medium said one or more files and location information of a the predetermined server that is a transfer destination for the one or more files, the location information being recorded on an attribute memory area of the removable recording medium storing said one or more files and said location information;
   a first display step of displaying, on a display, the location information read by said reading step, together with a first file transfer menu;
   a step of acquiring an indication, via the displayed first file transfer menu before transmission of the one or more files, from a user of whether or not to delete all of the one or more files to be transferred from the removable recording medium after the files have been transferred,
   a second display step of displaying, on the display if the indication acquired by the first deletion designating step is not to delete all of the one or more files to be transferred, a file selection menu for selecting files to be transferred;
   a selecting step of selecting one or more files stored in the removable recording medium to be transferred to the predetermined server corresponding to the location information read by said reading step;

a file transfer step of transferring all of the one or more files read by said reading step to a specific region on said predetermined server corresponding to the location information read by said reading step if the first deletion designating step acquires the indication that all of the one or more files are to be deleted, or transferring the one or more files selected by the selecting step to said predetermined server corresponding to the location information read by said reading step if the first deletion designating step acquires the indication that all of the one or more files are not to be deleted;

a confirmation step of confirming reception by the predetermined server corresponding to the location information of the one or more files transferred by the file transfer step;

a second deletion designating step of designating, after the transmission of the selected one or more files and confirmation by the confirmation step, acquiring an indication from the user of whether or not to delete the one or more transferred files from the removable recording medium; and a step of deleting all of the one or more transferred files from the removable recording medium if the first indication acquiring step acquires the indication to delete all of the one or more files, and for deleting the one or more files selected by the selecting step if the first deletion designating step acquires the indication not to delete all of the files and the second deletion designating step acquires the indication to delete the one or more selected files.

7. The file transfer method according to claim 6, wherein said location information recorded on said removable recording medium is inhibited from rewriting.

8. The file transfer method according to claim 6, wherein said location information indicates a specific region on any one of a plurality of servers storing the file.

9. The file transfer method according to claim 6, wherein said location information recorded on said removable recording medium is different for each removable recording medium.

10. The file transfer method according to claim 6, wherein said location information is recorded on said removable recording medium before the shipment or sale of said removable recording medium to a customer.

11. A computer-readable storage medium on which is stored a computer executable program for transferring one or more files recorded on a removable recording medium via a network to a predetermined server, said program comprising a program code for enabling a computer to perform:

reading out, from said removable recording medium, said one or more files and location information of said predetermined server that is a transfer destination of said one or more files, the location information being stored in an attribute memory area of said removable recording medium storing said one or more files and said location information;

a first display step of displaying, on a display, the location information read by said reading step, together with a first file transfer menu;

a step of acquiring an indication, via the displayed first file transfer menu before transmission of the one or more files, from a user of whether or not to delete all of the one or more files to be transferred from the removable recording medium after the files have been transferred;

a second display step of displaying, on the display if the indication acquired by the first deletion designating step is not to delete all of the one or more files to be transferred, a file selection menu for selecting files to be transferred;

a selecting step of selecting one or more files stored in the removable recording medium to be transferred to the predetermined server corresponding to the location information read by said reading step;

a file transfer step of transferring all of the one or more files read by said reading step to a specific region on said predetermined server corresponding to the location information read by said reading step if the first deletion designating step acquires the indication that all of the one or more files are to be deleted, or transferring the one or more files selected by the selecting step to said predetermined server corresponding to the location information read by said reading step if the first deletion designating step acquires the indication that all of the one or more files are not to be deleted;

a confirmation step of confirming reception by the predetermined server corresponding to the location information of the one or more files transferred by the file transfer step;

a second deletion designating step of designating, after the transmission of the selected one or more files and confirmation by the confirmation step, acquiring an indication from the user of whether or not to delete the one or more transferred files from the removable recording medium; and a step of deleting all of the one or more transferred files from the removable recording medium if the first indication acquiring step acquires the indication to delete all of the one or more files, and for deleting the one or more files selected by the selecting step if the first deletion designating step acquires the indication not to delete all of the files and the second deletion designating step acquires the indication to delete the one or more selected files.

12. A file recording system comprising:

a reading unit configured to read out from a removable recording medium one or more files and location information of an apparatus that is a file transfer destination for said one or more files, the location information being recorded in an attribute memory area of the removable recording medium storing said one or more files and said location information;

a first display unit configured to display, on a display, the location information read by said reading unit, together with a first file transfer menu;

a first deletion designating unit configured to acquire an indication, via the displayed first file transfer unit before transmission of said one or more files, from a user of whether or not to delete all of the one or more files to be transferred from the removable recording medium after the files have been transferred;

a second display unit configured to display, on the display if the indication acquired by the first deletion designating unit is not to delete all of the one or more files to be transferred, a file selection menu for selecting files to be transferred;

a selecting unit configured to select one or more files stored in the removable recording medium to be transferred to the apparatus corresponding to the location information read by the reading unit;

a file transfer unit configured to transfer all of the one or more files read by the reading unit to a specific region on the apparatus corresponding to the location information read by the reading unit if the first deletion designating unit acquires the indication that all of the one or more files are to be deleted, or to transfer the one or more files selected by the selecting unit to the apparatus corresponding to the location information read by the reading unit if the first deletion designating unit acquires the indication that all of the one or more files are not to be deleted;

a confirmation unit configured to confirm reception by the apparatus corresponding to the location information of the one or more files transferred by the file transfer unit;

a second deletion designating unit configured to, after the transmission of the selected one or more files and confirmation by the confirmation unit, acquire an indication from the user of whether or not to delete the one or more transferred files from the removable recording medium; and a deletion unit configured to delete all of the one or more transferred files from the removable recording medium if the first deletion designating unit acquires the indication to delete all of said one or more files, and to delete said one or more files selected by the selecting unit if the first deletion designating unit acquires the indication not to delete all of the files and the second deletion designating unit acquires the indication to delete the one or more selected files.

* * * * *

UNITED STATES PATENT AND TRADEMARK OFFICE
CERTIFICATE OF CORRECTION

| | | |
|---|---|---|
| PATENT NO. | : 7,403,979 B2 | Page 1 of 1 |
| APPLICATION NO. | : 10/689718 | |
| DATED | : July 22, 2008 | |
| INVENTOR(S) | : Shinji Shiraga | |

It is certified that error appears in the above-identified patent and that said Letters Patent is hereby corrected as shown below:

COLUMN 1:
    Line 42, "a disk space lending dealer was difficult" should read -- it was difficult for a disk space lending dealer --; and
    Line 43, "request a" should read -- requests --.

COLUMN 2:
    Line 33, "as" should read -- as a --; and
    Line 47, "at KIOSK" should read -- at a kiosk --.

COLUMN 3:
    Line 11, "sales" should read -- sale --.

COLUMN 5:
    Line 55, "transferred," should read -- transferred; --.

COLUMN 6:
    Line 48, "the" should be deleted; and
    Line 60, "transferred," should read -- transferred; --.

COLUMN 7:
    Line 20, "step," should read -- step, and --.

COLUMN 8:
    Line 27, "step," should read -- step, and --.

Signed and Sealed this
Twenty-second Day of February, 2011

David J. Kappos
*Director of the United States Patent and Trademark Office*